Butler & Ramsay,
Saw Frame.
No. 3,431. Fig. 1. Reissued May 11. 1869.
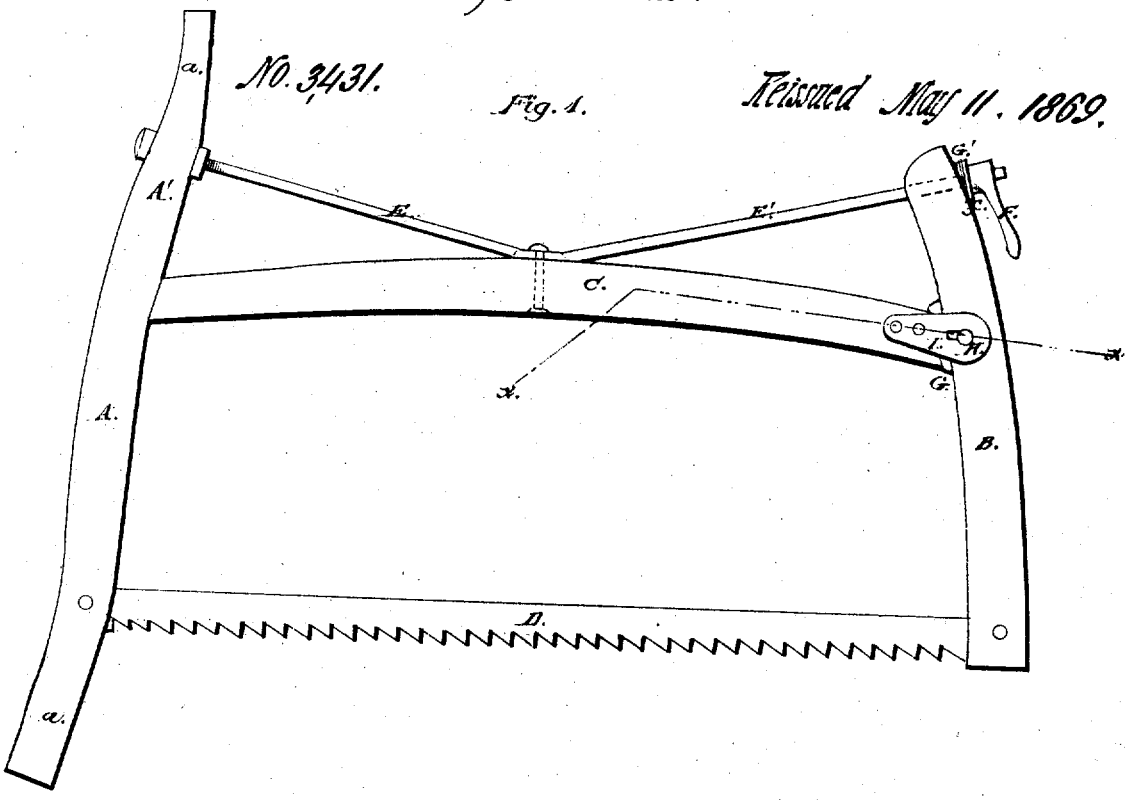
Fig. 2.
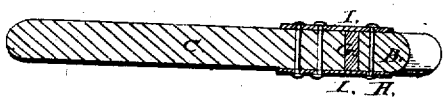
WITNESSES:
J. E. M. Bowen.
W. B. Deming
INVENTOR:
B. Butler
&
C. F. Ramsay
per
Knight Bros
Attys.
N. PETERS, PHOTO-LITHOGRAPHER, WASHINGTON, D. C.

UNITED STATES PATENT OFFICE.

BEAUMAN BUTLER, OF ST. JOHNSBURY CENTRE, VERMONT, FOR HIMSELF, AND BENJAMIN M. TILLOTSON, OF MANCHESTER, NEW HAMPSHIRE, ASSIGNEE OF CHAS. F. RAMSAY.

IMPROVEMENT IN SAW-FRAMES.

Specification forming part of Letters Patent No. 83,131, dated October 20, 1868; Reissue No. 3,431, dated May 11, 1869.

*To all whom it may concern:*

Be it known that BEAUMAN BUTLER and CHAS. F. RAMSAY, both of St. Johnsbury, in the county of Caledonia and State of Vermont, have invented a new and useful Improvement in Saw-Frames; and we do hereby declare the following to be a full, clear, and exact description of the same, reference being had to the accompanying drawings, which are made part of this specification, and in which—

Figure 1 is a side elevation of a saw frame illustrating the invention. Fig. 2 is a longitudinal section of a part of the frame on the plane indicated by the line *x x*.

The invention consists in an improved manner of bracing the frame and straining the saw, so as to render them both more efficient and durable and less liable to get out of order in use; also in the employment of cushions to relieve the frame of sudden strain, and connections which permit the said cushions to act.

In the drawing, A B represent the two end pieces of the frame, one of which is provided with the customary handle *a*, and, if desired, with an additional handle, *a'*.

C represents the cross-bar or fulcrum-piece; D, the saw, and E E' the straining-rod. The said straining-rod is bolted at its center to the cross-piece C, and secured to the projecting part A' of the upper end piece. A' C E will thus be seen to constitute a triangular brace, by which the handle end of the frame is made perfectly rigid. The free end E' of the straining-rod is screw-threaded, and, passing through the extremity of the lower end piece, B, receives a hand-nut, F, working upon a suitable washer, *f*, and employed to stretch the saw.

We prefer to interpose a cushion, G, of caoutchouc, or a spring of any suitable material, between the end piece, B, and the lower end of the cross-bar C, and to connect the said end piece and cross-bar by a bolt, H, in one of them, passing through slots in ears I I secured to the other. By this arrangement we are enabled to keep a constant tension on the saw, and avoid sudden or violent strain on any of the parts while in use.

The cushion may, if preferred, be applied at the other end of the cross-bar C, or, as at G', under the washer *f*, upon which the nut F works; or the saw may be connected to either of the end pieces by boxes working in slots, and supported by springs in opposition to the strain of the saw; or, when preferred, the elastic cushion or cushions may be applied to the common forms of frames by employing, in addition to the ordinary straining-rod, a rod similar to E, applied at either end of the frame, and having a cushion or spring at either or both ends, arranged in opposition to the strain of the saw.

The following may be named as advantages of our invention: First, rigidly bracing one end of the frame prevents it from becoming loose in the joints and yielding cornerwise, as frames of common construction are liable to do; second, the elastic bearing gives the saw, while strained for use, a degree of flexibility or elasticity that at once causes it to work better, and renders it less liable to break; third, by reason of the elasticity of the parts, the straining-nut will last much longer, and will more freely come into position (lengthwise of the end piece on which it bears) under different degrees of tension, with less liability to break the frame; fourth, the manner of bringing the center of the straining-rod down to the cross-bar and securing it thereto affords an economical and very efficient mode of bracing the frame.

The drawings show the rear or upper end of said straining-rod provided with a collar and an additional screw-nut. This, however, is not essential. Instead of both collar and nut, a single head may be used on the extreme end of the rod, so that the rod will be passed forward through the upper end piece, A, and its head received in a suitable countersink therein.

The entire arrangement makes the frame at once simple and durable, and not liable to get out of order in inexperienced hands.

The following is what we claim and desire to secure by Letters Patent:

1. The saw-frame constructed with either or or both of its two ends A′ C E and B C E′ either rigid or flexible, when braced by the connection of the central part of the rod E E′ to the cross-piece C, substantially as set forth.

2. The provision, in a buck-saw frame, of the spring or cushion G or G′, substantially as and for the purpose set forth.

3. The slotted ears I I, or their equivalent, employed to connect the cross-bar and end piece and permit mutual play between them, substantially as described.

BEAUMAN BUTLER.
BENJAMIN M. TILLOTSON.

Witnesses as to Butler:
WM. H. BRERETON, Jr.,
OCTAVIUS KNIGHT.
Witnesses as to Tillotson:
CHAS. H. CHASE,
EDWARD M. TILLOTSON.